(12) United States Patent
Lee et al.

(10) Patent No.: US 7,797,481 B2
(45) Date of Patent: Sep. 14, 2010

(54) METHOD AND APPARATUS FOR FLASH MEMORY WEAR-LEVELING USING LOGICAL GROUPS

(75) Inventors: Yang-Sup Lee, Seoul (KR); Chan-Ik Park, Seoul (KR); Won-Moon Cheon, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 11/771,531

(22) Filed: Jun. 29, 2007

(65) Prior Publication Data

US 2008/0313505 A1    Dec. 18, 2008

(30) Foreign Application Priority Data

Jun. 14, 2007    (KR) ...................... 10-2007-0058417

(51) Int. Cl.
*G06F 12/16*    (2006.01)
(52) U.S. Cl. ................ 711/103; 711/209; 711/E12.084; 714/47
(58) Field of Classification Search ........................ None
See application file for complete search history.

(56) References Cited

U.S. PATENT DOCUMENTS

| | | | |
|---|---|---|---|
| 5,418,752 A * | 5/1995 | Harari et al. ................. | 365/218 |
| 6,081,447 A | 6/2000 | Lofgren et al. | |
| 6,230,233 B1 * | 5/2001 | Lofgren et al. .............. | 711/103 |
| 6,381,176 B1 | 4/2002 | Kim et al. | |
| 6,587,915 B1 | 7/2003 | Kim | |
| 6,594,183 B1 | 7/2003 | Lofgren et al. | |

(Continued)

FOREIGN PATENT DOCUMENTS

KR    1999-0074703    10/1999

(Continued)

OTHER PUBLICATIONS

Chanik Park, Wonmoon Cheon, Jeonguk Kang, Kangho Roh, Wonhee Cho, and Jin-Soo Kim. "A Reconfigurable FTL (Flash Translation Layer) Architecture for NAND Flash-Based Applications." Jul. 2008. ACM. ACM Transactions on Embedded Computing Systems. vol. 7. No. 4.*

(Continued)

*Primary Examiner*—Reginald G Bragdon
*Assistant Examiner*—Nathan Sadler
(74) *Attorney, Agent, or Firm*—F. Chau & Associates, LLC

(57) ABSTRACT

A memory system and corresponding method of wear-leveling are provided, the system including a controller, a random access memory in signal communication with the controller, and another memory in signal communication with the controller, the other memory comprising a plurality of groups, each group comprising a plurality of first erase units or blocks and a plurality of second blocks, wherein the controller exchanges a first block from a group with a second block in response to at least one block erase count within the group; and the method including receiving a command having a logical address, converting the logical address into a logical block number, determining a group number for a group that includes the converted logical block number, and checking whether group information comprising block erase counts for the group is loaded into random access memory, and if not, loading the group information into random access memory.

39 Claims, 10 Drawing Sheets

U.S. PATENT DOCUMENTS

| | | | |
|---|---|---|---|
| 6,938,116 | B2 | 8/2005 | Kim et al. |
| 6,973,531 | B1 * | 12/2005 | Chang et al. .............. 711/103 |
| 7,032,087 | B1 * | 4/2006 | Chang et al. .............. 711/156 |
| 2004/0083335 | A1 * | 4/2004 | Gonzalez et al. ........... 711/103 |
| 2004/0186946 | A1 * | 9/2004 | Lee ........................... 711/103 |
| 2006/0149896 | A1 * | 7/2006 | Chang et al. .............. 711/103 |

FOREIGN PATENT DOCUMENTS

| | | |
|---|---|---|
| KR | 1999-0075161 | 10/1999 |
| KR | 1020050050148 | 5/2005 |
| KR | 1020050059314 | 6/2005 |
| KR | 1020050083850 | 8/2005 |

OTHER PUBLICATIONS

Jeong-Uk Kang, Heeseung Jo, Jin-Soo Kim, and Joonwon Lee. "A Superblock-based Flash Translation Layer for NAND Flash Memory." Oct. 2006. ACM. EMSOFT'06.*

Li-Pin Chang and Tei-Wei Kuo. "Efficient Management for Large-Scale Flash-Memory Storage Systems with Resource Conservation." Nov. 2005. ACM. ACM Transactions on Storage. vol. 1. No. 4. pp. 381-418.*

* cited by examiner

1

METHOD AND APPARATUS FOR FLASH MEMORY WEAR-LEVELING USING LOGICAL GROUPS

CROSS-REFERENCE TO RELATED APPLICATION

This application claims foreign priority under 35 U.S.C. §119 to Korean Patent Application No. P2007-0058417, filed on Jun. 14, 2007, in the Korean Intellectual Property Office, the disclosure of which is incorporated by reference herein in its entirety.

BACKGROUND OF THE INVENTION

The present disclosure generally relates to data storage systems using flash memory technologies. More specifically, the present disclosure relates to controlling flash memory systems to substantially extend their useful lifetime or endurance.

Flash memory is typically divided into several blocks, each of which is individually erasable. All flash memory cells within a block are typically erased together. Flash memory cells each have a limited useful lifetime in terms of the number of times that they can be reprogrammed or erased. This limitation may often be due to electrons becoming trapped in the respective gate and tunnel dielectric layers during repetitive programming. Repeated erasure of a block tends to wear out the cells in the block leading to a reduced capability to distinguish between the erased state and the programmed state, and resulting in a longer time required to erase the block.

The ability of a Flash memory device to withstand wear is often called "endurance". The endurance may be specified in terms of the minimum or the average number of times that each Flash block may be erased without encountering significant failures. Endurance numbers are currently in the range of hundreds of thousands of cycles in the case of single level cell ("SLC") devices, and in the range of tens of thousands of cycles in the case of multi level cell ("MLC") devices. Repeated and frequent writes to a single block, or to a small number of blocks, will bring the onset of failures sooner and end the useful lifetime of the flash device more quickly.

Wear-leveling is a class of techniques, typically implemented in firmware, for balancing the erase counts of physical blocks to better utilize the expected lifetime of NAND flash devices, for example. If the write operations can be more evenly distributed among all blocks of the device, each block will experience closer to the maximum number of erases that it can endure before other blocks exceed the maximum. Thus, the onset of failures may be substantially delayed, thereby increasing the useful lifetime and endurance of the Flash memory device.

SUMMARY OF THE INVENTION

These and other issues are addressed by a system and method for flash memory wear-leveling. Exemplary embodiments are provided.

An exemplary memory system with wear-leveling includes a wear-leveling controller, a random access memory in signal communication with the controller, and another memory in signal communication with the controller, the other memory comprising a plurality of groups, each group comprising a plurality of first erase units or blocks and a plurality of second blocks, wherein the controller exchanges a first block from a group with a second block in response to at least one block erase count within the group.

An exemplary method of wear-leveling a memory device includes receiving a command having a logical address, converting the logical address into a logical block number, determining a group number for a group that includes the converted logical block number, and checking whether group information comprising block erase counts for the group is loaded into random access memory, and if not, loading the group information into random access memory.

Another exemplary method of wear-leveling a memory device includes dividing a first region of the device into a plurality of groups wherein each group comprises a plurality of erase units or blocks, calculating a group erase count for each group in response to at least one block erase count from the group, and replacing a block in one group in response to a comparison of the calculated group erase counts.

The present disclosure will be further understood from the following description of exemplary embodiments, which is to be read in connection with the accompanying drawings.

BRIEF DESCRIPTION OF THE DRAWINGS

The present disclosure provides a system and related method for flash memory wear-leveling in accordance with the following exemplary figures, in which.

DETAILED DESCRIPTION OF PREFERRED EMBODIMENTS

Figure 1:
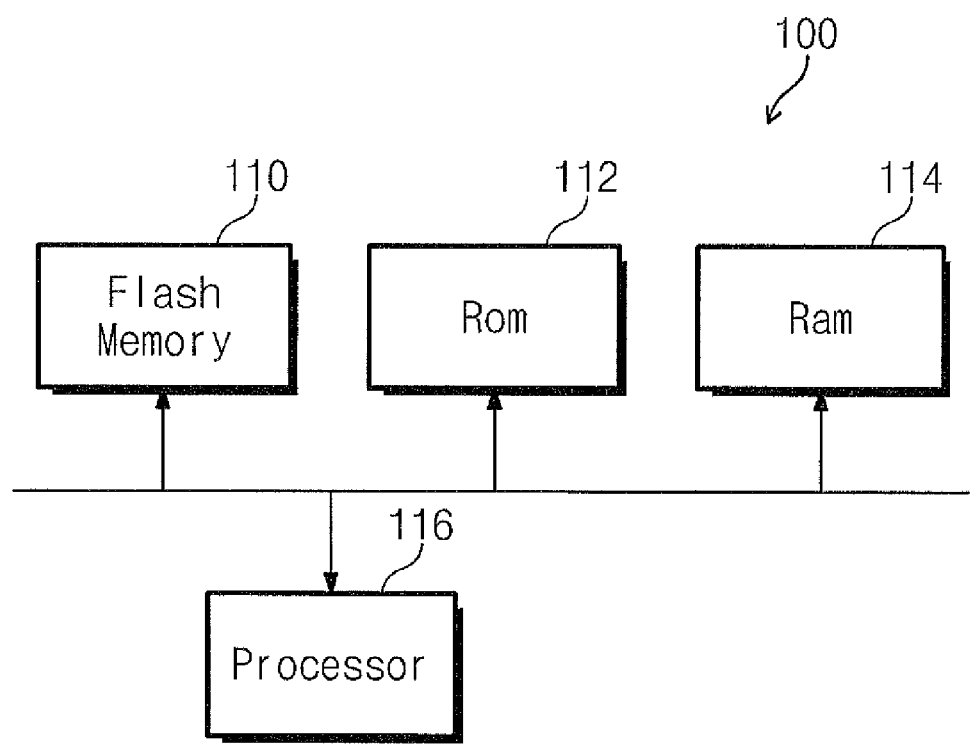
FIG. 1 shows a schematic block diagram for a flash memory system.

As shown in FIG. 1, a flash memory system is indicated generally by the reference numeral 100. The flash memory system 100 includes a processor 116, a flash memory 110 in signal communication with the processor, a read-only memory ("ROM") 112 in signal communication with the processor, and a random access memory ("RAM") 114 in signal communication with the processor. The ROM 112, for example, may include program steps executable by the processor 116 for providing read and write commands to read data from and write data to the flash memory 110 or the RAM 114. The flash memory 110 may include a wear-leveling controller to perform read and write operations in the flash memory in response to the commands. Alternately, the processor 116 may implement a wear-leveling control, such as a firmware control from the ROM 112, for example. The read and write operations responsive to the commands are performed in the flash memory 110 in accordance with wear-leveling embodiments of the present disclosure. In addition, the ROM 112 and the RAM 114 may store related data structures and/or application program steps executable by the processor 116.

Figure 2:
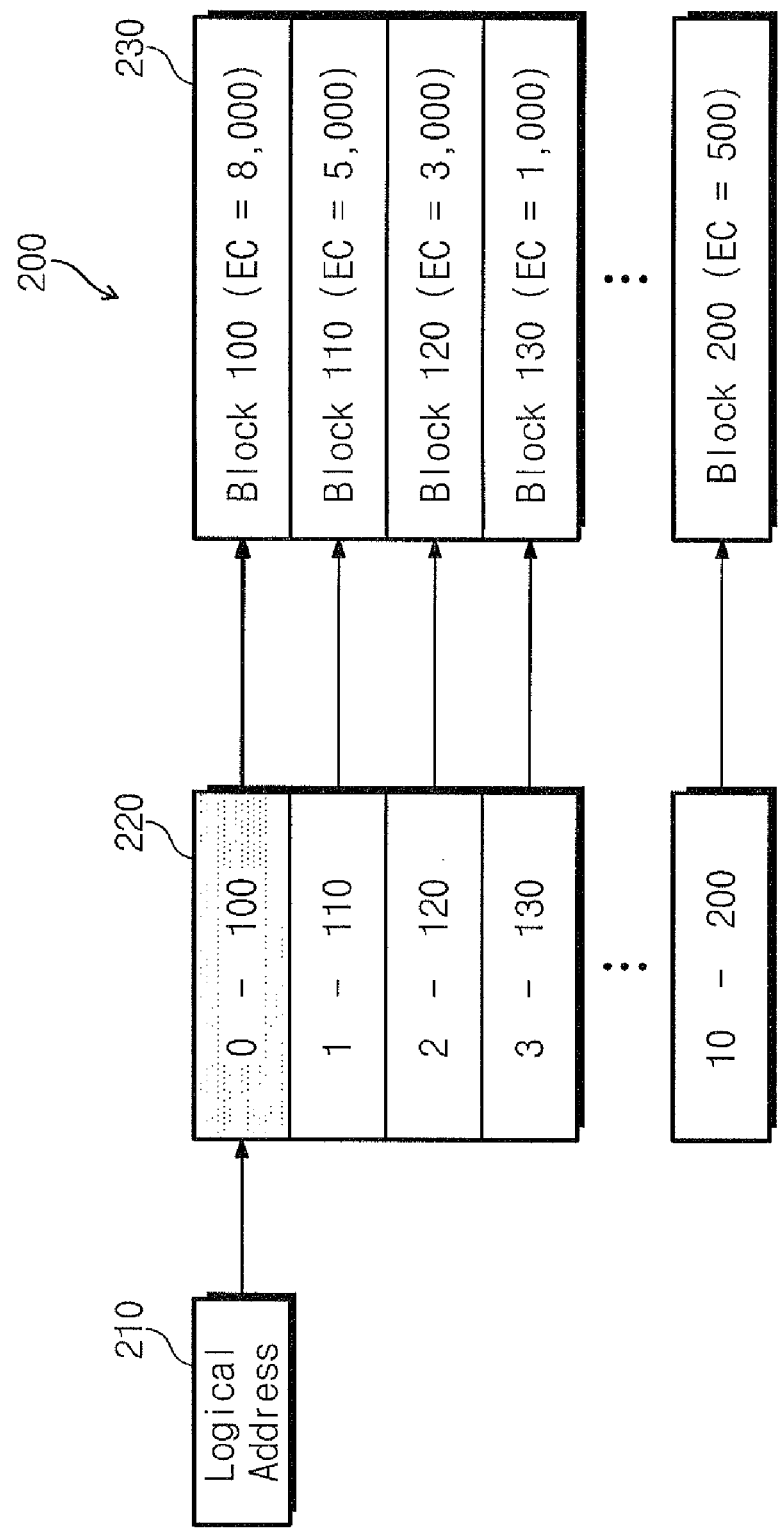
FIG. 2 shows a schematic block diagram for a flash memory controller.

Turning to FIG. 2, a flash memory controller is indicated generally by the reference numeral 200. The controller 200 includes a logical address unit 210 connected to a mapping table 220, which, in turn, is connected to a memory bank 230. The mapping table 220 includes a number of logical to physical entries. In this example, logical addresses 0, 1, 2, 3 . . . 10 are mapped to physical addresses 100, 110, 120, 130 . . . 200, respectively. The memory bank 230 includes a number of physical memory blocks having physical addresses 100, 110, 120, 130 . . . 200. Each physical memory block has an associated erase count ("EC"). In this example, the physical memory blocks at physical addresses 100, 110, 120, 130 . . . 200 have erase counts of 8000, 5000, 3000, 1000 . . . 500, respectively.

In operation, the controller 200 accesses a physical address (e.g., Block 100) in the memory bank 230 corresponding to a logical address (e.g., "0") from the mapping table 220, and writes data received from a host to the block at that physical address. Irrespective of the frequency in use or erase count of each block, data is unconditionally written into a block initially assigned in the mapping table. In many cases, only a few blocks are used frequently and worn.

Figure 3:
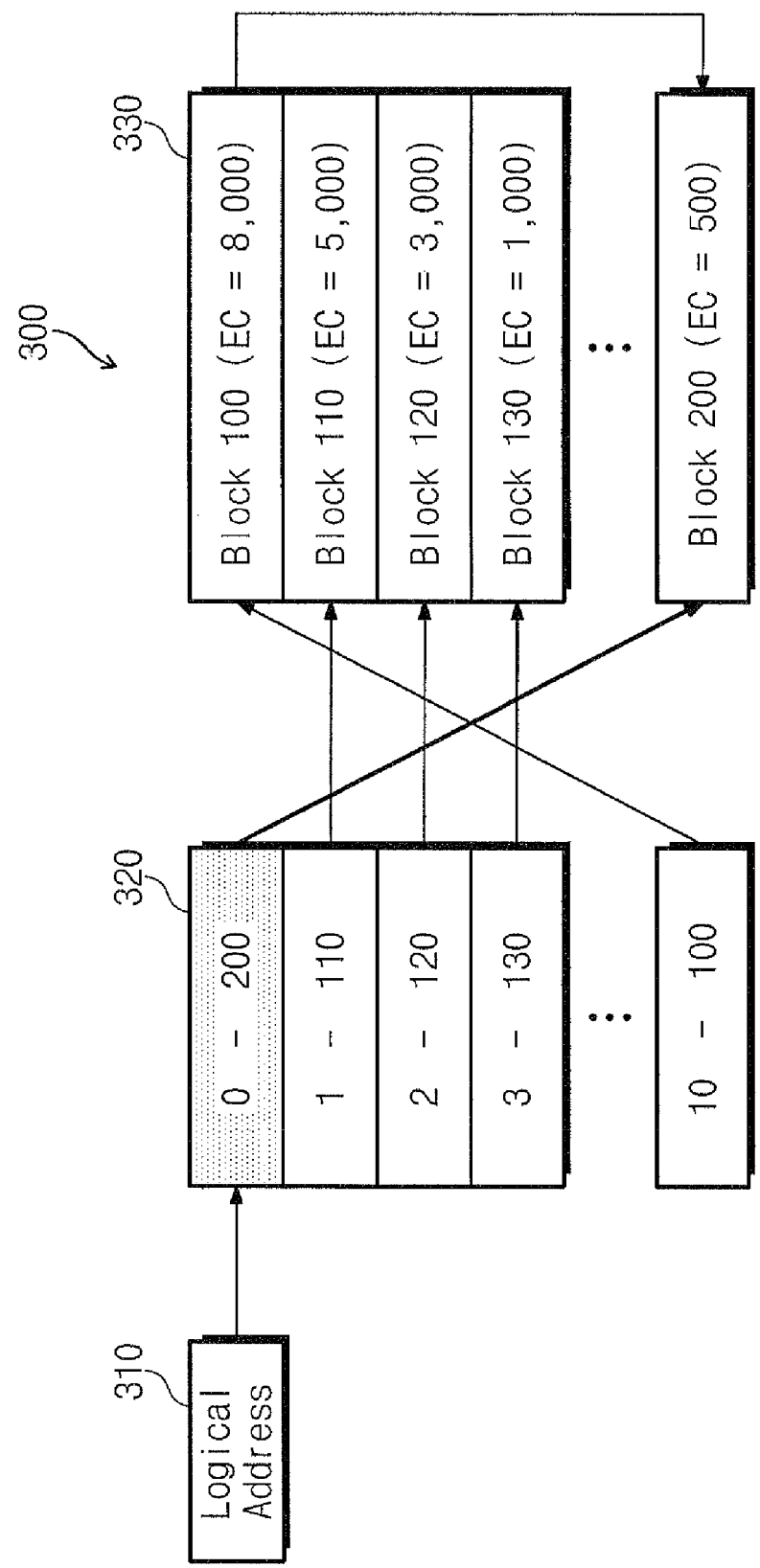
FIG. 3 shows a schematic block diagram for a wear-leveling flash memory controller with data block to data block interchange.

Turning now to FIG. 3, a flash memory controller with active wear-leveling and data block to data block interchange is indicated generally by the reference numeral 300. The controller 300 includes a logical address unit 310 connected to a mapping table 320, which, in turn, is connected to a memory bank 330. The mapping table 320 includes a number of logical to physical entries. In this example, logical addresses 0, 1, 2, 3 . . . 10 are mapped to physical addresses 200, 110, 120, 130 . . . 100, respectively. The memory bank 330 includes a number of physical memory blocks having physical addresses 100, 110, 120, 130 . . . 200. Each physical memory block has an associated erase count ("EC"). In this example, the physical memory blocks at physical addresses 100, 110, 120, 130 . . . 200 have erase counts of 8000, 5000, 3000, 1000 . . . 500, respectively.

In operation, the controller 300 performs a remapping process so that the variation in the number of writes or erase counts of each block will not exceed a predetermined number. The mapping table 320 maps original logical addresses to updated physical addresses. In this example, the physical addresses associated with logical addresses 0 and 10 are exchanged. That is, logical address 0 becomes associated with physical block 200, which has a current erase count of 500, while logical address 10 becomes associated with physical block 100, which has a current erase count of 8000. Thus, the blocks are used more evenly and endurance is improved.

Figure 4:
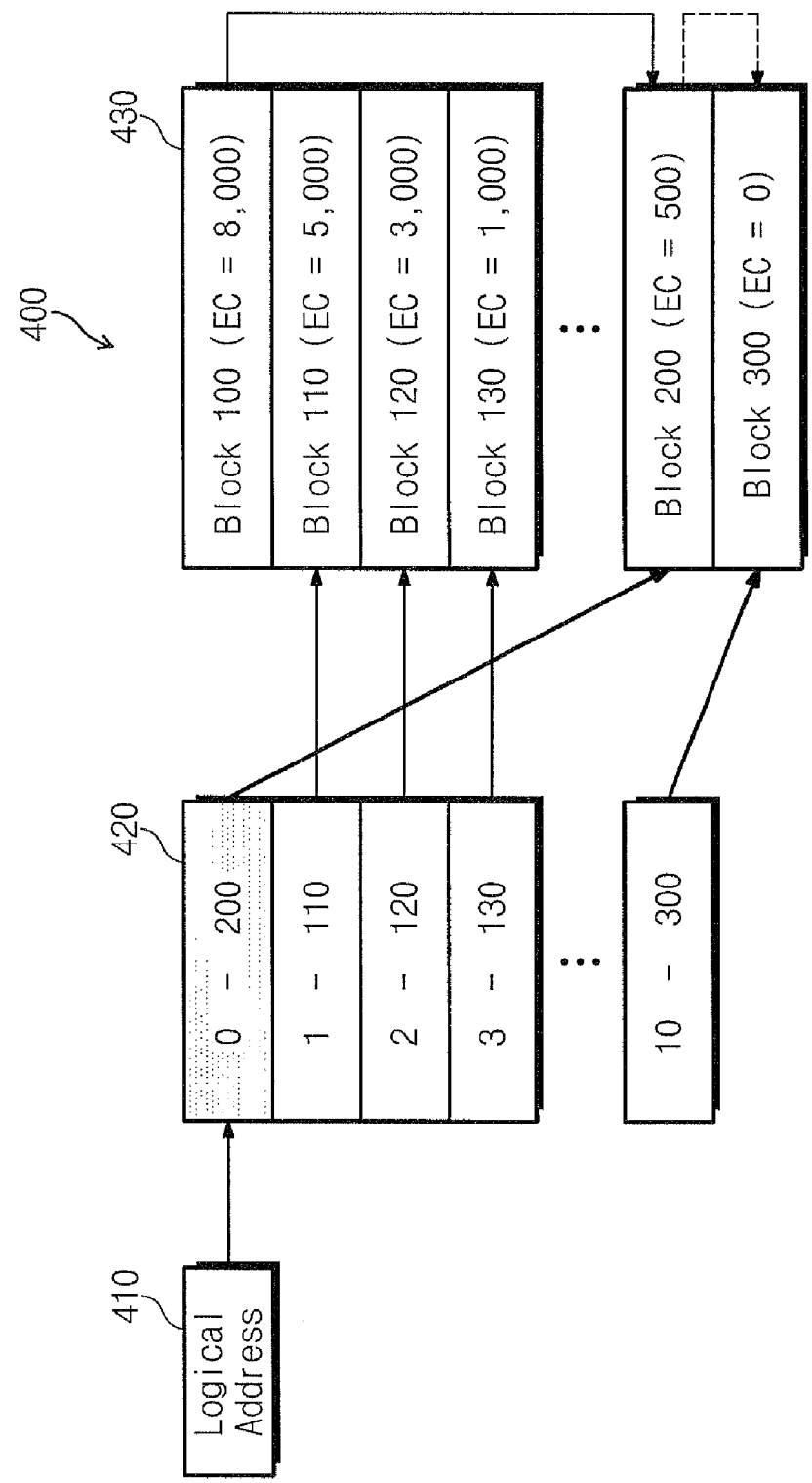
FIG. 4 shows a schematic block diagram for a wear-leveling flash memory controller with data block to free block interchange.

As shown in FIG. 4, a flash memory controller with active wear-leveling and data block to free block interchange is indicated generally by the reference numeral 400. The controller 400 includes a logical address unit 410 connected to a mapping table 420, which, in turn, is connected to a memory bank 430. The mapping table 420 includes a number of logical to physical entries. In this example, logical addresses 0, 1, 2, 3 . . . 10 are mapped to physical addresses 200, 110, 120, 130 . . . 300, respectively. The memory bank 430 includes a number of physical memory blocks having physical addresses 100, 110, 120, 130 . . . 200, 300. Each physical memory block has an associated erase count ("EC"). In this example, the physical memory blocks at physical addresses 100, 110, 120, 130 . . . 200, 300 have erase counts of 8000, 5000, 3000, 1000 . . . 500, 0, respectively.

In operation, the controller 400 performs a remapping process so that the variation in the number of writes or erase counts of each block will not exceed a predetermined number. The mapping table 420 maps original logical addresses to updated physical addresses. In this example, the physical address associated with logical address 10 is updated to that of block 300, and then the physical address associated with logical address 0 is updated to that of block 200. That is, logical address 0 becomes associated with physical block 200, which has a current erase count of 500, while logical address 10 becomes associated with physical block 300, which has a current erase count of 0. Therefore, the blocks are used more evenly and endurance is improved.

Figure 5:
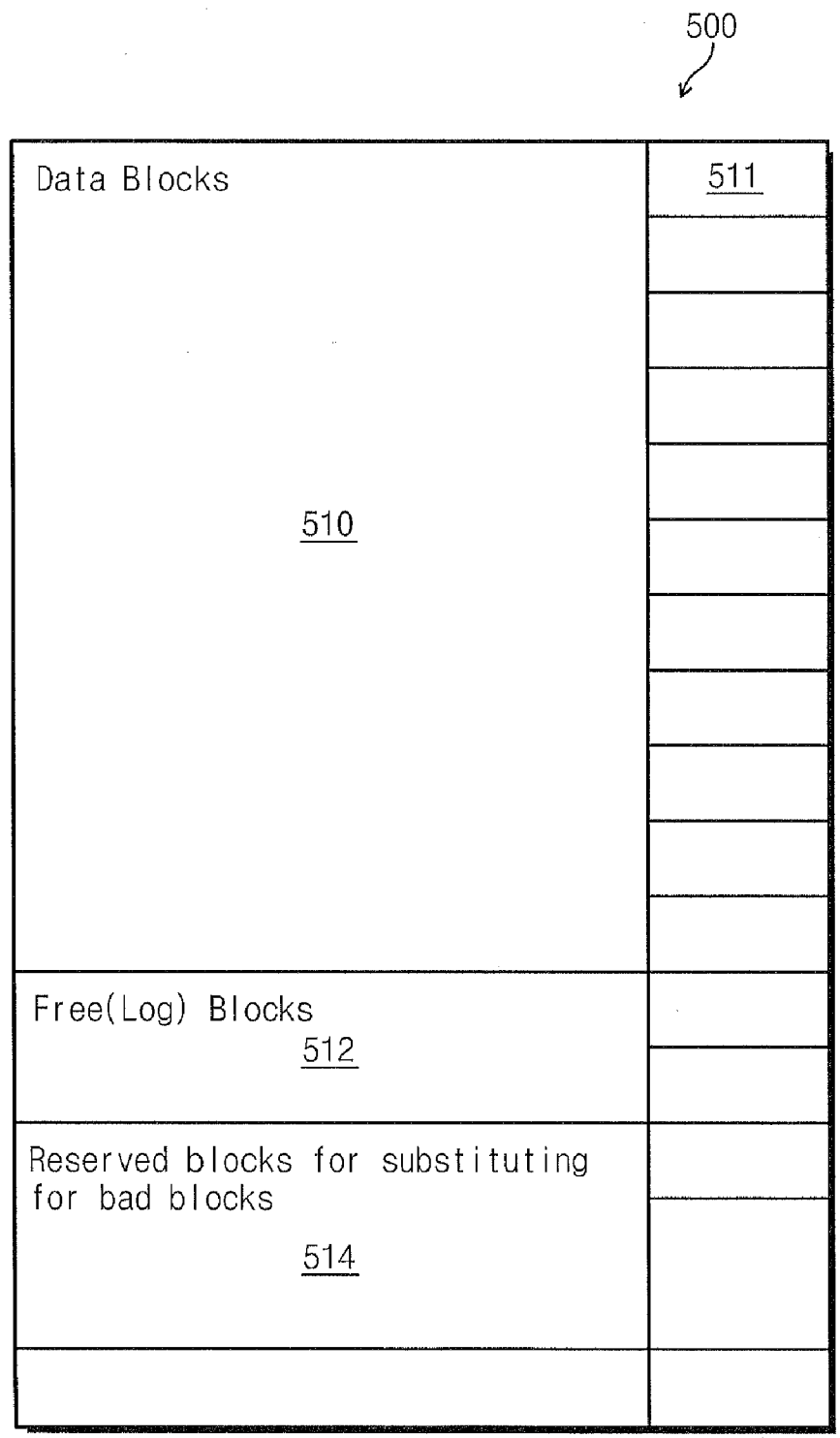
FIG. 5 shows a schematic block diagram for a wear-leveling flash memory that maintains erase counts for memory blocks in spare areas of the respective memory blocks.

Turning to FIG. 5, a wear-leveling flash memory is indicated generally by the reference numeral 500. The wear-leveling flash memory may include data blocks 510 each having a spare area 511, free or log blocks 512, and reserved blocks 514. The data blocks are used to store data. The free blocks are initially unused. The log blocks are drawn from the free blocks and used to store updates to data blocks. The wear-leveling flash memory 500 maintains erase counts for memory blocks in the spare areas 511 of the respective data blocks 510. That is, a controller may record the number of erases that each block has experienced, or its erase count, in the spare areas of the respective blocks. An address translator within the controller may receive a logical address from a host, and translate the logical address into a physical address, which indicates an actual location of the flash memory in which data will be stored. Thus, remapping is performed to balance the frequency of use or erase counts for the memory blocks.

In operation of the flash memory 500, erase counts are stored in spare areas 511 of the data blocks 510. Referring back to the controller 400 of FIG. 4, for example, data stored in a memory block having a minimum erase count (e.g., Block 200) is moved to a current spare block (e.g., Block 300). Data stored in a memory block having a maximum erase count (e.g., Block 100) is moved to a memory block having a minimum erase count (e.g., Block 200). Data in a memory block having a maximum erase count (e.g., Block 100) is assigned to new spare block. The new spare block (e.g., Block 100) is not used until erase counts of other blocks are larger than that of this block. When the new spare block is used, the address mapping or translation table is updated accordingly.

Figure 6:
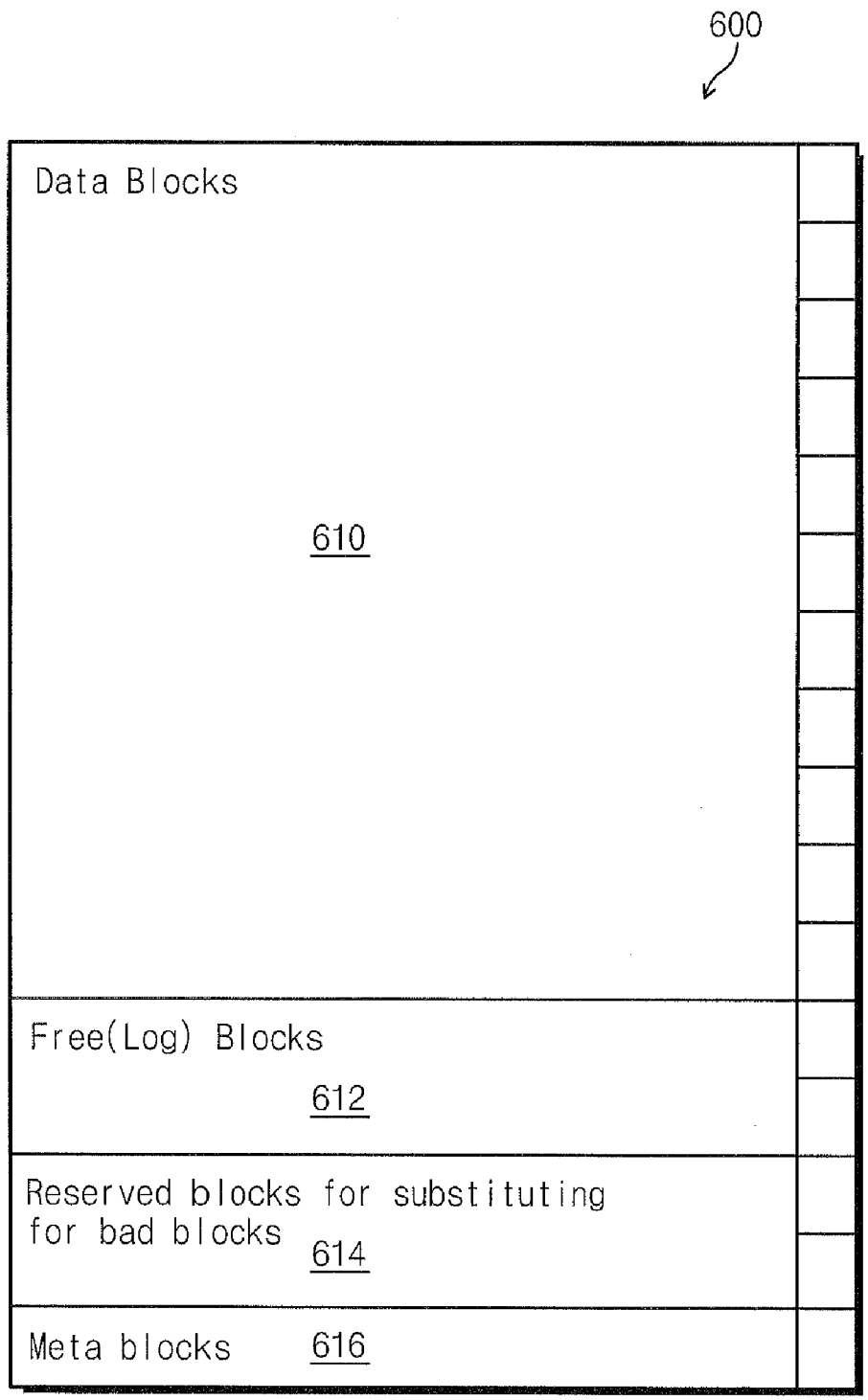
FIG. 6 shows a schematic block diagram for a wear-leveling flash memory that maintains erase counts for memory blocks in separate meta blocks.

Turning now to FIG. 6, a flash memory with wear-leveling is indicated generally by the reference numeral 600. The wear-leveling flash memory may include data blocks 610, free or log blocks 612, reserved blocks 614 and meta blocks 616. The data blocks are currently used to store data. The free blocks are initially unused. The log blocks are drawn from the free blocks and used to store updates to data blocks or updates to meta blocks, and the meta blocks may be used to store logical to physical mapping information. In addition, the wear-leveling flash memory 600 maintains erase counts for memory blocks in the meta blocks 616. That is, the wear-leveling flash memory 600 maintains erase counts for data blocks in the separate meta blocks. Thus, the wear-leveling flash memory 600 does not need to store erase counts in spare areas of the data blocks, for example, and need not individually access each data block merely to determine its stored erase count. Accessing multiple erase counts stored in a meta block is faster and more efficient, for example.

In operation of a 4G NAND Flash Memory that is composed of 4,096 blocks, for example, erase counts of each block may be stored in meta blocks rather than in a spare region of each block. When data is received, the controller assigns a free block to a log block according to a logical address of the data, and writes the received data into the log block.

If no free blocks remain, a merge operation is performed. The merge operation merges valid data of a log block and a data block corresponding to the log block, and generates new free blocks. Free or log blocks and meta blocks are the most frequently updated. A wear-leveling technique is performed between the free blocks and data blocks, and between the meta blocks and free blocks.

For a basic free block wear-leveling, erase counts of all data blocks are compared to each other. A search of the meta data for the maximum and/or minimum erase counts of all data blocks is performed. In addition, a high-density static random access memory ("SRAM") may be used for scanning erase counts of all data blocks more quickly. Controllers may include about 20 KB of SRAM. In a 4G NAND Flash Memory with 4,096 blocks, 16 KB of SRAM may be used to expeditiously compare the erase counts. SRAM may also store other data, such as a mapping table. A careful balance of SRAM usage should be maintained in order to minimize degradation of controller performance due to comparisons of erase counts for all data blocks in this basic free block wear-leveling.

Figure 7:
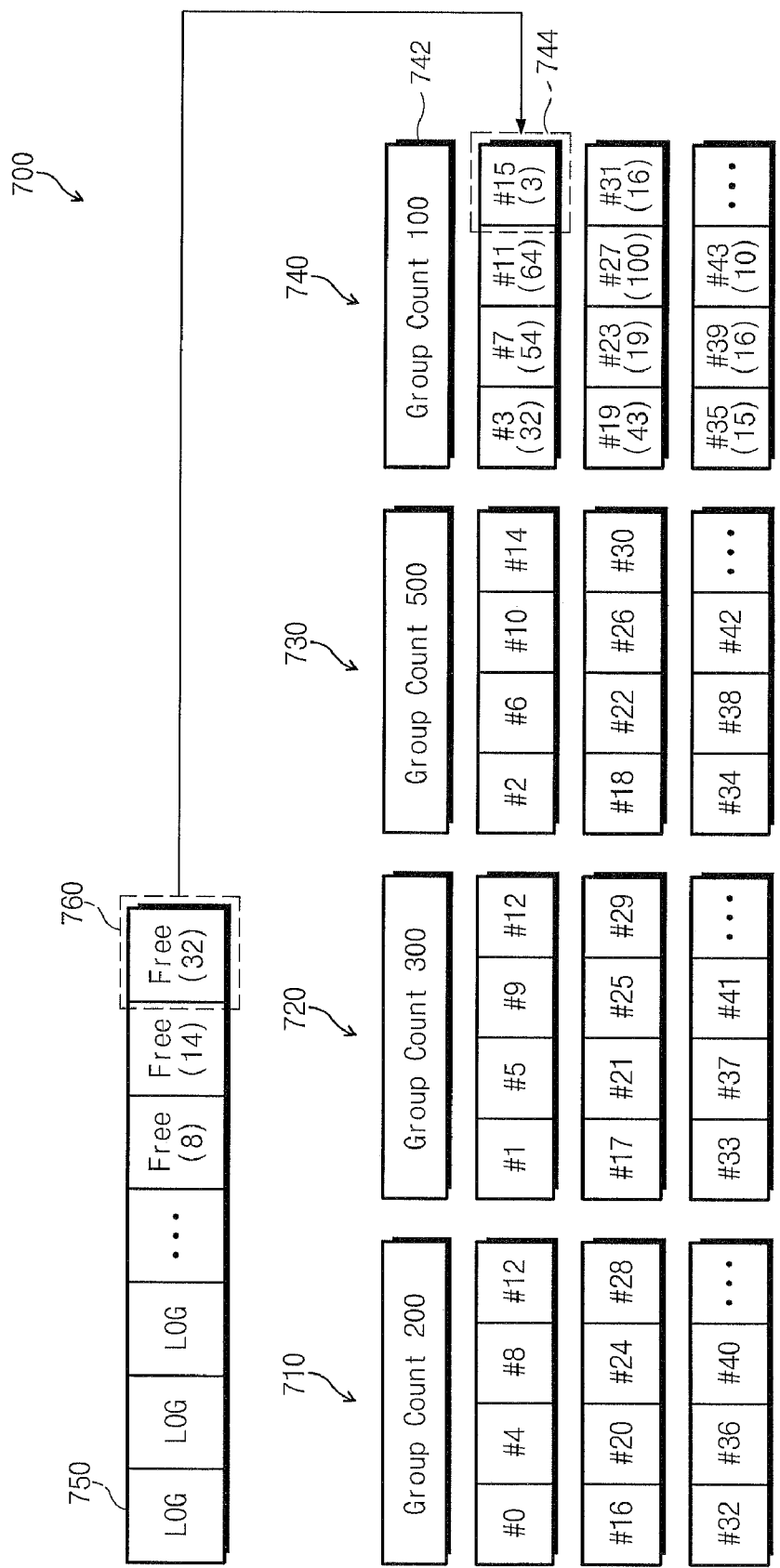
FIG. 7 shows a schematic block diagram for a wear-leveling flash memory controller that performs wear-leveling between free blocks and data blocks in accordance with an exemplary embodiment of the present disclosure.

As shown in FIG. 7, a wear-leveling flash memory controller is indicated generally by the reference numeral 700. The flash memory controller 700 performs wear-leveling between free blocks and data blocks in accordance with an exemplary embodiment of the present disclosure. The exemplary flash memory controller 700 includes first through fourth memory block groups 710, 720, 730 and 740, respectively. Each memory block group includes a plurality of memory blocks, each having a logical address. A group count is associated with each group.

In this exemplary embodiment, the logical addresses of the memory blocks are interlaced among the groups. An algorithm for grouping the memory blocks determines the group number as the block number modulo the total number of groups. With four groups, for example, the block number may be determined as the block number modulo 4.

Thus, when the modulo remainder is zero, the block is grouped into the $0^{th}$ group, here Group 710. When the modulo remainder is one, the block is grouped into the $1^{st}$ group, here Group 720. When the modulo remainder is two, the block is grouped into the $2^{nd}$ group, here Group 730. When the modulo remainder is three, the block is grouped into the $3^{rd}$ group, here Group 740. Thus, group 710 includes the memory blocks having logical addresses 0, 4, 8, 12, 16, 20, 24, 28, 32, 36, 40 . . . ; Group 720 includes the memory blocks having logical addresses 1, 5, 9, 13, 17, 21, 25, 29, 33, 37, 41 . . . ; Group 730 includes the memory blocks having logical addresses 2, 6, 10, 14, 18, 22, 26, 30, 34, 38, 42 . . . ; and Group 740 includes the memory blocks having logical addresses 3, 7, 11, 15, 19, 23, 27, 31, 35, 39, 43 . . . . Here, Group 710 has an associated Group Count of 200; Group 720 has an associated Group Count of 300; Group 730 has an associated Group Count of 500; and Group 740 has an associated Group Count of 100.

The flash memory controller 700 further includes log blocks 750 and free blocks 760. Any free block may be exchanged with any physical block indicated by a logical address in any of the groups. In addition, any log block may be associated with any logical address.

In operation of the wear-leveling flash memory controller 700, a Group Count is calculated for each group. The Group Count may be the maximum erase count for any block in the group, for example. In this exemplary case, the group having the minimum Group Count is selected, such as the group 740 having a Group Count 742 of 100. Next, this group is scanned to determine the minimum erase count for any block in the group. Here, the physical block 744 associated with logical address #15 has the minimum erase count of 3. The free block having a maximum erase count of all free blocks, such as the free block 760 that has an erase count of 32, is swapped with the block 744, which has the minimum erase count in group 740. In a wear-leveling scheme between free blocks and data blocks, for example, data blocks are divided into several groups, such as four groups in the example above. The free block wear-leveling includes calculating erase counts for blocks within groups, saving the maximum erase count of all data blocks within a group as the group count for that group, selecting the data block having the minimum erase count of data blocks in that group having the minimum group count, and swapping the free block with the maximum erase count of the free blocks for the selected data block. Thus, only the erase counts in the group with the minimum group count are scanned.

In alternate embodiments, the data blocks may include standard data, meta data, and/or log data. In further embodiments, a group count may be defined as the minimum erase count in a group, as the average erase count in a group, or the like rather than as the maximum erase count in the group as in the current exemplary embodiment. In one alternate embodiment, a meta block wear-leveling control is considered. This is a wear-leveling scheme between meta blocks and free blocks. The meta block wear-leveling may be performed whenever writing data. The number of meta blocks may be smaller than the number of data blocks.

If the number of meta blocks is much smaller than the number of data blocks, the time for comparing erase counts of meta blocks may be relatively fast. Thus, the grouping scheme may not be needed.

In operation of the alternate meta block wear-leveling, the method includes finding the meta block with the maximum erase count of all of the meta blocks, finding a free block with the minimum erase count of all of the free blocks, and swapping the found meta block for the found free block.

Figure 8:
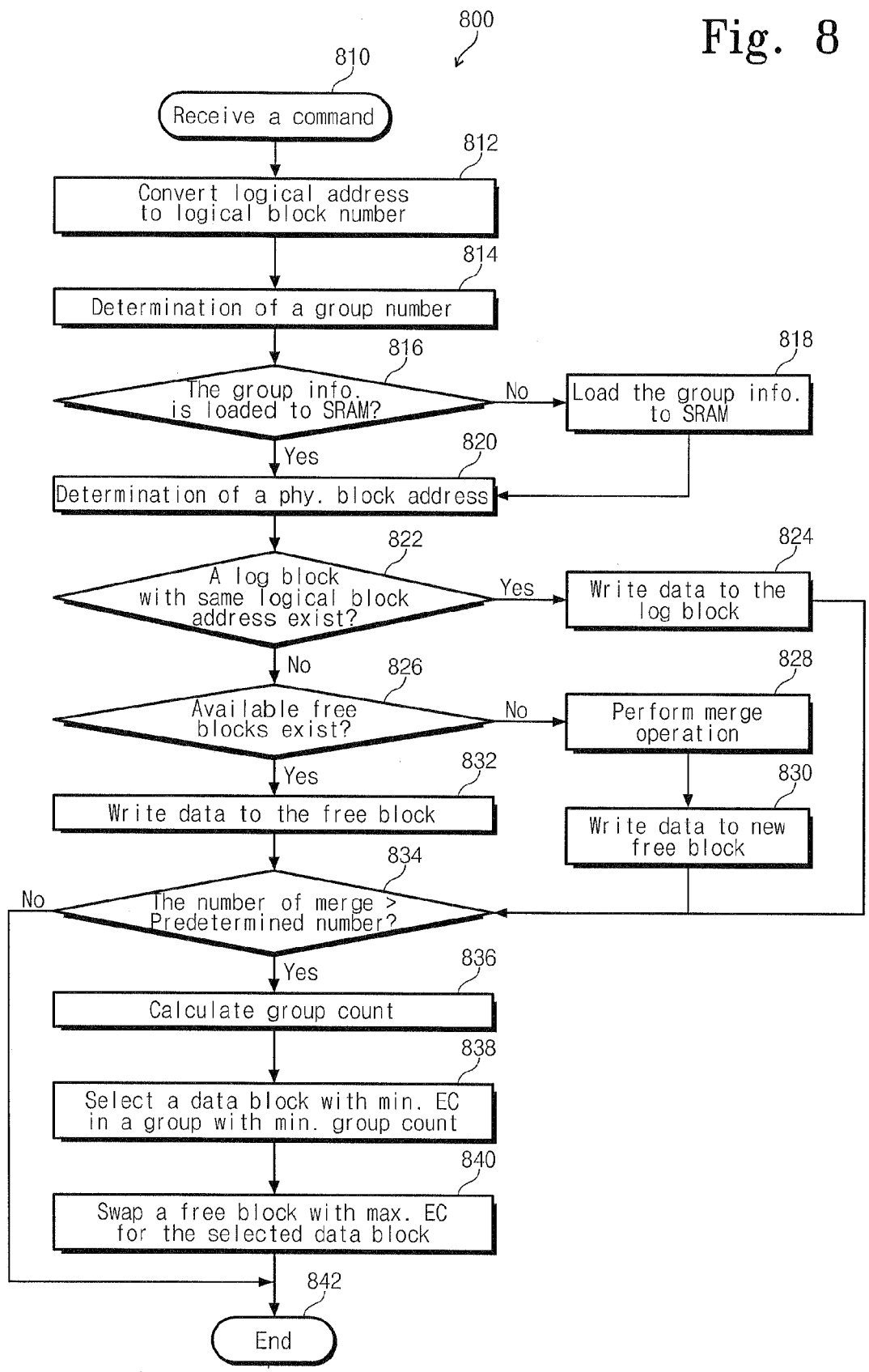
FIG. 8 shows a schematic flow diagram for a wear-leveling flash memory control where group counts are calculated and swapping is performed when the number of merge operations exceeds a predetermined number in accordance with an exemplary embodiment of the present disclosure.

Turning to FIG. 8, a free block wear-leveling flash memory control is indicated generally by the reference numeral 800. In the control 800, group counts are calculated and swapping is performed when the number of merge operations exceeds a predetermined number. The control 800 includes a start block 810 that passes control to a function block 812. The function block 812 converts a logical address to a logical block number, and passes control to a function block 814. The function block 814 determines a group number corresponding to the logical block number, and passes control to a decision block 816. The decision block 816 determines whether the group information is loaded into SRAM, and if so, passes control to function block 820. If not, control passes control to function block 818, which loads the group information into SRAM, and then passes to function block 820. Function block 820 determines the physical block address corresponding to the logical block number, and passes control to a decision block 822.

The decision block 822, in turn, determines whether a log block corresponding to the same logical block address already exists, and if so, passes control to a function block 824, which writes the data to a log block and passes control to a decision block 834. If not, the decision block 822 passes control to a decision block 826, which determines whether any free blocks currently exist, and if so, passes control to a function block 832, which writes data to the free block and passes control to the decision block 834. If not, the decision block 826 passes control to a function block 828, which performs a merge operation. The function block 828, in turn, passes control to a function block 830, which writes data to a new free block, and passes control to the decision block 834.

Figure 9:
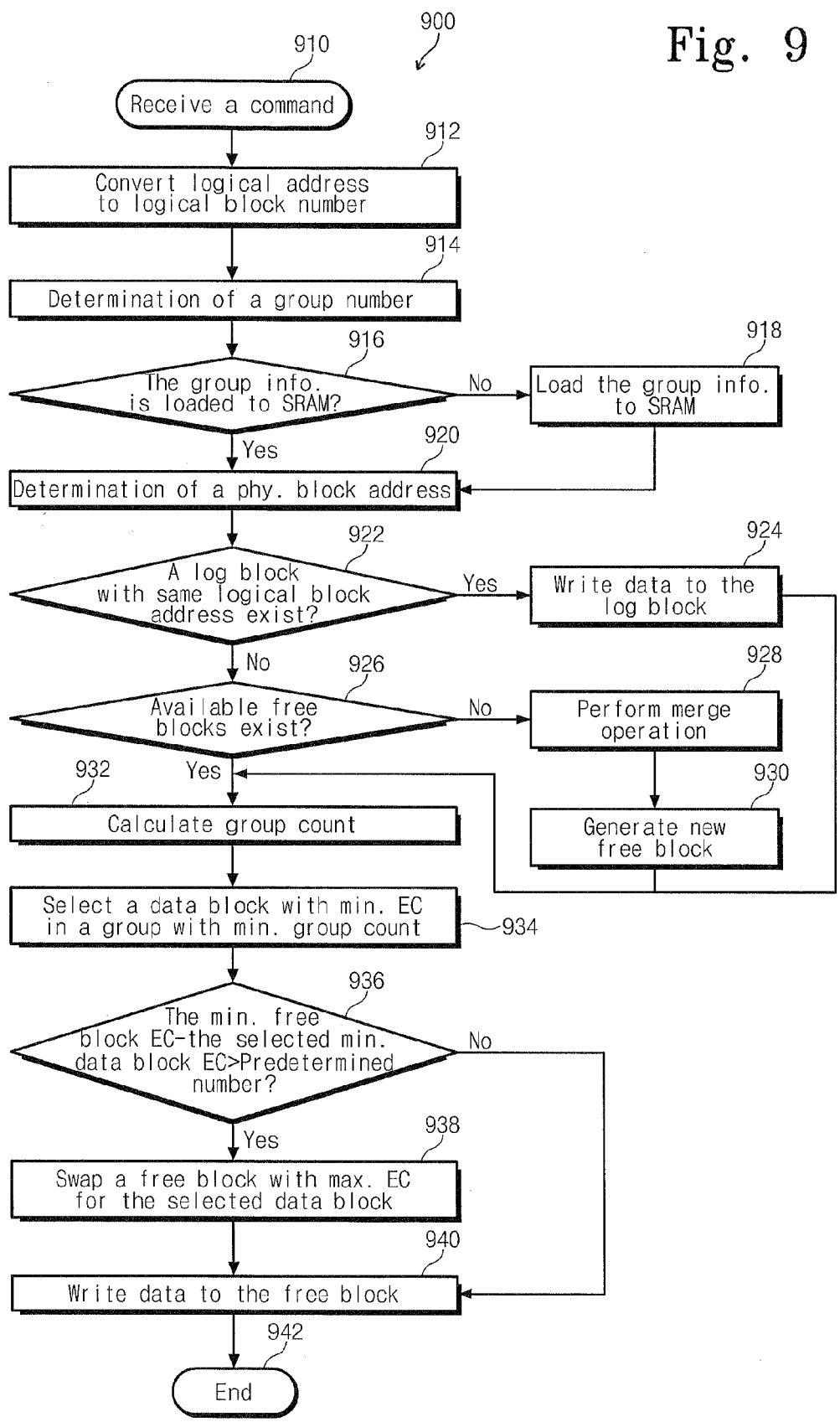
FIG. 9 shows a schematic flow diagram for a wear-leveling flash memory control where group counts are always calculated after write operations, and swapping is performed when a variance between the minimum free block erase count and the minimum data block erase count exceeds a predetermined number in accordance with an exemplary embodiment of the present disclosure.

The decision block 834 determines whether the number of merge operations is greater than a predetermined number, and if not, control passes to an end block 842. If so, control passes to a function block 836, which calculates a group count. The function block 836, in turn, passes control to a function block 838, which selects a data block with a minimum erase count from a group with a minimum group count. The function block 838 passes control to a function block 840, which swaps a free block with having a maximum erase count for the selected data block. The function block 840 passes control to the end block 842. Thus, group counts are calculated and swapping is performed when the number of merge operations is determined at decision block 834 to exceed a predetermined number. Turning now to FIG. 9, another free block wear-leveling flash memory control is indicated generally by the reference numeral 900. In the control 900, group counts are always calculated after write operations, and swapping is performed when a variance between the minimum free block erase count and the minimum data block erase count exceeds a predetermined number. The control 900 includes a start block 910 that passes control to a function block 912. The function block 912 converts a logical address to a logical block number, and passes control to a function block 914. The function block 914 determines a group number corresponding to the logical block number, and passes control to a decision block 916. The decision block 916 determines whether the group information is loaded into SRAM, and if so, passes control to function block 920. If not, control passes to function block 918, which loads the group information into SRAM, and then passes control to function block 920. Function block 920 determines the physical block address corresponding to the logical block number, and passes control to a decision block 922.

The decision block 922, in turn, determines whether a log block corresponding to the same logical block address already exists, and if so, passes control to a function block 924, which writes the data to a log block and passes control to a function block 932. If not, the decision block 922 passes control to a decision block 926, which determines whether any free blocks currently exist, and if so, passes control to the function block 932, which calculates the group count and passes control to a function block 934. If not, the decision block 926 passes control to a function block 928, which performs a merge operation. The function block 928, in turn, passes control to a function block 930, which generates a new free block and passes control to the function block 932.

The function block 934 selects a data block having a minimum erase count from a group having a minimum group count, and passes control to a decision clock 936. The decision block 936 determines whether the minimum free block erase count minus the selected minimum data block erase count is greater than a predetermined number. If so, control passes to a function block 938. If not, control passes to a function block 940. The function block 938 swaps the free block for the data block, and passes control to the function block 940. The function block 940 writes data to the free block, and passes control to an end block 942.

Thus, in the control 900, group counts are always calculated after a write operation. Swapping is performed when the variance between the minimum free block erase count and the minimum data block erase count is determined at decision block 936 to exceed a predetermined number.

Figure 10:
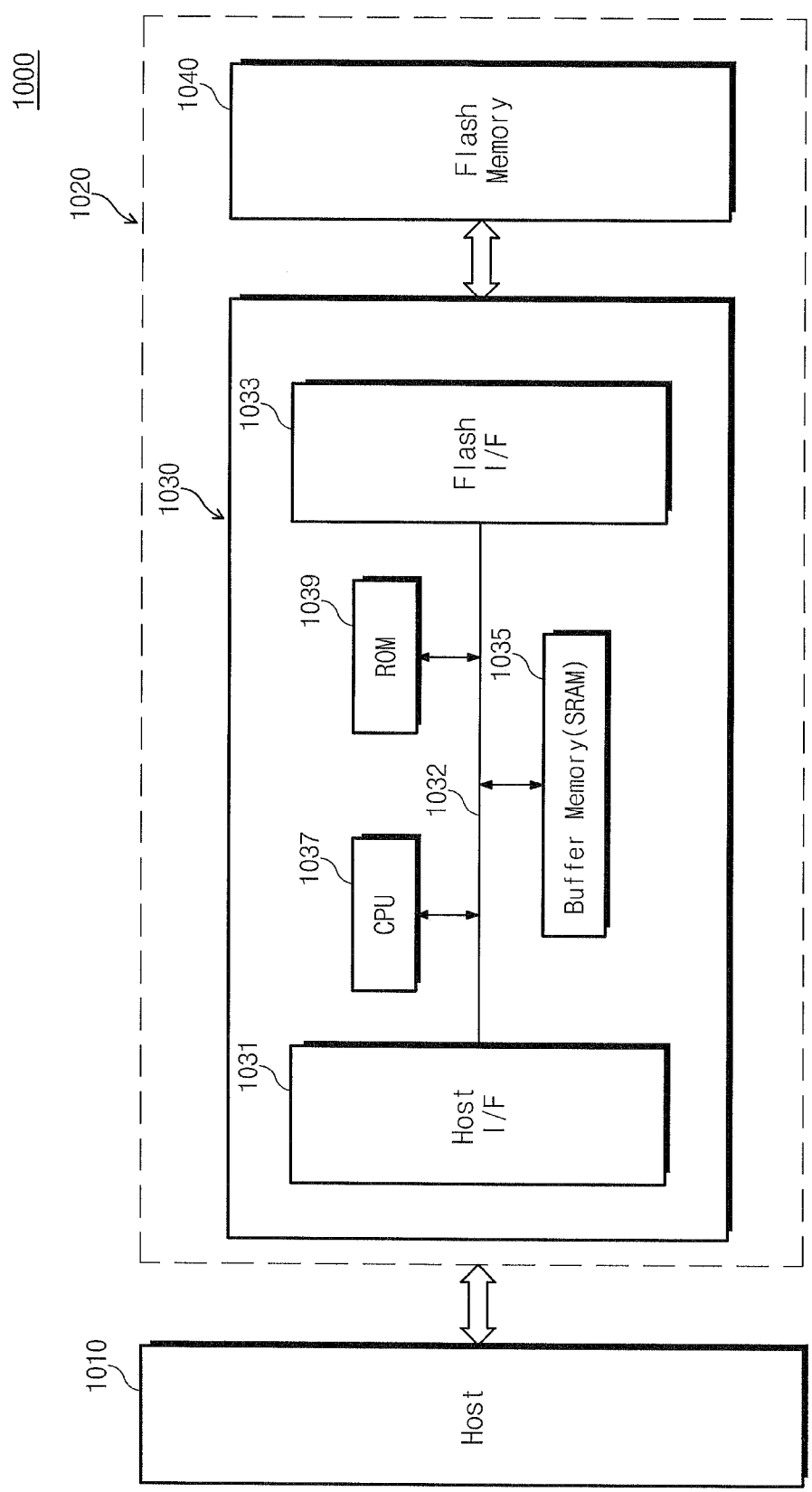
FIG. 10 shows a schematic block diagram for a flash card memory system in accordance with an exemplary embodiment of the present disclosure.

As shown in FIG. 10, a flash card memory system with wear-leveling is indicated generally by the reference numeral 1000. The flash card system includes a host 1010 and a flash card 1020. The flash card 1020 includes a controller 1030 and a flash memory 1040. The controller 1030 includes a host interface 1031 in signal communication between the host 1010 and a bus 1032; a flash interface 1033 in signal communication between the bus 1032 and the flash memory 1040; a buffer memory 1035, such as SRAM, in signal communication with the bus 1032; a processor or CPU 1037 in signal communication with the bus 1032; and a read-only memory ("ROM"), such as mask ROM, in signal communication with the bus 1032.

In operation of the system 1000, firmware for wear-leveling may be stored in the ROM 1039 or in the flash memory 1040, for example. The erase count of each block is loaded to buffer memory 1035 from meta blocks within the flash memory 1040, and sorted by the CPU 1037.

Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A method of wear-leveling a memory device, the method comprising:

grouping a first region of the device into a plurality of logical groups each comprising a plurality of logical block numbers;

checking whether logical group information comprising block erase counts for logical block numbers in a logical group is loaded into random access memory ("RAM"), and if not, loading the logical group information into RAM;

calculating a group erase count for the logical group from the block erase counts in RAM wherein the calculated group erase count is one of a minimum, maximum or average of all of the block erase counts for the logical block numbers currently in the logical group;

receiving a command having a logical address;

converting the logical address into a logical block number;

determining a logical group number for a current logical group that includes the converted logical block number; and checking whether an accumulated number of merge operations is greater than a predetermined number, and if so, selecting a logical block number currently classified as a data block number and having a minimum block erase count from another logical group having a minimum group erase count, and swapping the selected logical block number from the other logical group into the current logical group in exchange for a logical block number currently classified as a free block number and having a maximum block erase count.

2. A method as defined in claim 1 wherein the command is a write command, further comprising checking whether a log block for the same logical block number already exists, and if so, copying write data to the associated log block.

3. A method as defined in claim 1 wherein the command is a write command, further comprising:
checking if a free block is available, and if none are free, performing a merge operation to free a block; and
copying write data to the free block.

4. A method as defined in claim 1, further comprising determining a physical block address corresponding to the logical block number.

5. A method as defined in claim 1 wherein the command is a read command, further comprising:
reading a mapping table entry associated with requested data, and if it indicates that a log block contains the requested data, returning the requested data from the log block; and
if the mapping table entry associated with the requested data indicates that the latest data is in the data block, reading the data block itself and returning the requested data from the data block.

6. A method as defined in claim 1, further comprising:
checking whether the variance between an erase count for a free block and an erase count for a data block in a group is greater than a predetermined variance, and if so, swapping the free block with the data block.

7. A method as defined in claim 6, further comprising calculating a group erase count whenever a free block is used.

8. A method as defined in claim 6 wherein the erase count for the free block is a maximum erase count for all free blocks, and the erase count for the data block is a minimum erase count for all data blocks in the group.

9. A method as defined in claim 8 wherein the erase count for the group is a minimum erase count for all groups.

10. A method as defined in claim 1, the memory device comprising at least one of DRAM, PRAM, MRAM, FRAM, EEPROM, or Flash Memory.

11. A method as defined in claim 1, further comprising checking whether the accumulated number of merge operations is greater than a predetermined number, and if so, calculating group erase counts for each of a plurality of groups.

12. A method as defined in claim 1, further comprising address translating a logical block number to a physically addressable memory block as data is written to or read from the memory block.

13. A method as defined in claim 12 wherein the physically addressable memory blocks comprise non-volatile memory.

14. A method as defined in claim 1 wherein the logical block numbers are initially interleaved among the logical groups.

15. A method of wear-leveling a memory device, the method comprising:
dividing a first region of the device into a plurality of logical groups wherein each logical group comprises a plurality of logical erase units or logical blocks;
calculating a group erase count for each logical group in response to at least one block erase count from the logical group, wherein the calculated group erase count for a logical group is a minimum, maximum or average of all of the block erase counts in said logical group; and
replacing a logical block in one logical group in response to a comparison of the calculated group erase counts when an accumulated number of merge operations is greater than a predetermined number, wherein a logical block having a maximum block erase count is swapped out for a logical block having a minimum block erase count from a logical group having a minimum group erase count,
wherein a logical block currently classified as a free block and having a maximum block erase count is swapped out for a logical block currently classified as a data block and having a minimum block erase count.

16. A method as defined in claim 15 wherein the blocks are interleaved among the plurality of logical groups.

17. A method as defined in claim 15, further comprising performing a merge operation to free a block, wherein the step of replacing a block is performed when a number of merge operations reaches a threshold.

18. A method as defined in claim 17 wherein the step of performing a merge operation is performed when there are no free blocks remaining.

19. A method as defined in claim 15, further comprising defining a second region comprising free blocks within the memory.

20. A method as defined in claim 19 wherein the first region is a data region and the second region is a log or free region.

21. A method as defined in claim 19, further comprising:
defining a meta region within the memory; and
exchanging a block from the second region with a block from the meta region having a different block erase count.

22. A method as defined in claim 19, further comprising calculating a group erase count for each group, wherein exchanging a block from the second region with a block having a different block erase count is responsive to all of the calculated group erase counts.

23. A method as defined in claim 15, further comprising accumulating a block erase count for at least one of said plurality of blocks in each group.

24. A method as defined in claim 15 wherein calculating a group erase count comprises loading block erase count information for blocks of one group at a time into random access memory ("RAM"), and calculating a group erase count for the loaded group.

25. A method as defined in claim 15, further comprising defining a reserved region within the memory for storing blocks reserved for replacing defective blocks.

26. A method as defined in claim 15, further comprising defining a meta region within the memory for storing at least one of erase counts for all blocks or mapping information indicative of mapping blocks to physical block addresses.

27. A method as defined in claim 15, further comprising reserving a spare area in each block for storing an erase count of the block.

28. A method as defined in claim 15 wherein each block comprises a plurality of read/write units or pages.

29. A method as defined in claim 15, further comprising accumulating a block erase count for each of said plurality of blocks in each group.

30. A method as defined in claim 15 wherein said block erase count corresponds to the total number of erasures for a block.

31. A wear-leveling memory system comprising:
a controller;
a random access memory ("RAM") in signal communication with the controller; and
another memory in signal communication with the controller, the other memory comprising a plurality of logical groups, each logical group comprising a plurality of first logical erase units or logical blocks and a plurality of second logical blocks, wherein the controller is disposed for exchanging a first logical block from a logical group with a second logical block in response to at least one block erase count within the logical group by calculating a group erase count for each logical group in response to at least one block erase count from the logical group where the group erase count is a minimum, maximum or average of all the block erase counts in the logical group, and replacing a logical block in the logical group in response to a comparison of the calculated group erase counts when an accumulated number of merge operations is greater than a predetermined number where a logical block having a maximum block erase count is swapped out for a logical block having a minimum block erase count from a logical group having a minimum group erase count, wherein a logical block currently classified as a free block and having a maximum block erase count is swapped out for a logical block currently classified as a data block and having a minimum block erase count.

32. A system as defined in claim 31 wherein the RAM size is sufficient to store all block erase counts for one group at a time, but insufficient to store all block erase counts for all groups at once.

33. A system as defined in claim 31 wherein the first blocks comprise data blocks and the second blocks comprise free blocks.

34. A system as defined in claim 31 wherein the first blocks comprise meta blocks and the second blocks comprise free blocks.

35. A system as defined in claim 31, the other memory further comprising blocks defining at least one of erase counts or physical address mapping information for the first blocks.

36. A system as defined in claim 31, the first blocks each comprising a data portion and a spare portion, the spare portion for defining at least one of erase counts or physical address mapping information for the first blocks.

37. A system as defined in claim 31 wherein the controller comprises program control steps stored in the other memory.

38. A system as defined in claim 31, further comprising a read-only memory ("ROM") in signal communication with the controller, wherein the controller comprises program control steps stored in the ROM.

39. A system as defined in claim 31 wherein the pluralities of first logical block numbers are arranged in an interleaved order among the initialized logical groups.

* * * * *